United States Patent [19]

Merchant

[11] Patent Number: 5,598,811

[45] Date of Patent: Feb. 4, 1997

[54] LITTER SAVING WASTE CONTAINER SYSTEM

[76] Inventor: Mark A. Merchant, P.O. Box 211136, Anchorage, Ak. 99521

[21] Appl. No.: 435,955

[22] Filed: May 5, 1995

[51] Int. Cl.⁶ ............................ A01K 29/00; A01K 1/035
[52] U.S. Cl. ............................................. 119/166
[58] Field of Search ................................. 119/166, 165, 119/167

[56] References Cited

U.S. PATENT DOCUMENTS

| | | | |
|---|---|---|---|
| 2,963,003 | 2/1958 | Oberg et al. | 119/166 |
| 2,971,493 | 12/1958 | Robb | 119/166 |
| 4,312,295 | 1/1982 | Harrington | 119/167 |
| 4,325,325 | 4/1982 | Larter | 119/166 |
| 4,771,731 | 9/1988 | Derx et al. | 119/166 |
| 4,784,082 | 11/1988 | Wolfe | 119/167 |
| 4,817,560 | 4/1989 | Prince et al. | 119/166 |
| 5,158,042 | 10/1992 | Hammerslag et al. | 119/167 |
| 5,359,960 | 11/1994 | Yananton | 119/165 |

*Primary Examiner*—Robert P. Swiatek
*Assistant Examiner*—Yvonne R. Abbott
*Attorney, Agent, or Firm*—Alfred F. Hoyte, Jr.

[57] ABSTRACT

An animal waste container having at least three nested receptacles is provided. One of the receptacles has a perforated bottom for sifting out clean litter. The other two receptacles have an annular lip for locking engagement with a removable top, as well as integrally formed handles which can be interlocked with the top. The removable top has an internally formed pour spout as well as handles which interlock with the handles in the receptacles.

3 Claims, 2 Drawing Sheets

LITTER SAVING WASTE CONTAINER SYSTEM

The present invention relates to a container for litter which can be used by cats or other small animals.

DESCRIPTION OF THE PRIOR ART

Sanitary receptacles for use as indoor commodes for pets, particularly cats, are quite well known. The most common arrangement is to provide a receptacle having a bottom and side walls, the side walls being of sufficient height prevent litter or other absorbent material from being flung outside of the receptacle by the pet. The bottom is lined with a bed of fluid absorbent material such as sand or litter. Litter is preferably used as it has some odor removing capability. Once the litter is covered with waste it is typically discarded resulting in the waste of litter which is not contaminated with waste.

Several devices have been proposed to solve the problem of wasted litter, most of these devices provide a screen or perforated surface which is used to sift out the good litter for reuse.

U.S. Pat. No. 4,771,731 issued to Derx et al. discloses one such device. The device has two nested containers with a fluid impervious bag placed thereinbetween. The top container has a perforated bottom to sift out the clean litter for reuse. The problem with the Derx device is that the sidewalls of the top container are lower than the sidewalls of the bottom container. Thus the sidewalls of the top container may be too shallow to allow for containment of litter which is flung by the pet. If the sidewalls of the top container are sufficiently high to contain the litter, then the combined height of the containers may make access to the device difficult for some pets.

U.S. Pat. No. 4,171,680 issued to Silver et al. discloses a disposable animal waste container which uses a plurality of nested trays, each tray having a bed of absorbent material thereon. The trays have relatively low sidewalls which may not contain displaced litter.

Thus, modifications to the receptacles have tended to result in modifications to the dimensions of the receptacles which result in interference with the normal operation of the receptacles.

Another problem with prior art waste containers is that the litter ultimately must be poured from the receptacle, either to be reused or discarded. As a result of the animal waste contained in the litter a great deal of bacteria is dispersed therein, which bacteria can become airborne when pouring the litter. Accordingly, it would be desirable to control the drifting of particulate matter when pouring the litter from the receptacle.

SUMMARY OF THE INVENTION

It is an object of this invention to provide an improved animal waste container.

It is another object of this invention to provide an improved animal waste container which results in a savings in litter or other absorbent material.

It is yet another object of this invention to provide an improved animal waste container which has means for preventing the drifting of particulate matter when pouring the litter.

It is still another object of this invention to provide an improved animal waste container which allows for easy access to pets while still containing any litter which may be displaced within the receptacle.

These and other objects of the invention are accomplished by providing an animal waste container having three nested receptacles. One of the receptacles has a perforated bottom for sifting out clean litter. The other two receptacles have an annular lip for locking engagement with a removable top, as well as integrally formed handles which can be interlocked with the top. The removable top has an integrally formed pour spout as well as handles which interlock with the handles in the receptacles.

DETAILED DESCRIPTION

Figure 1:
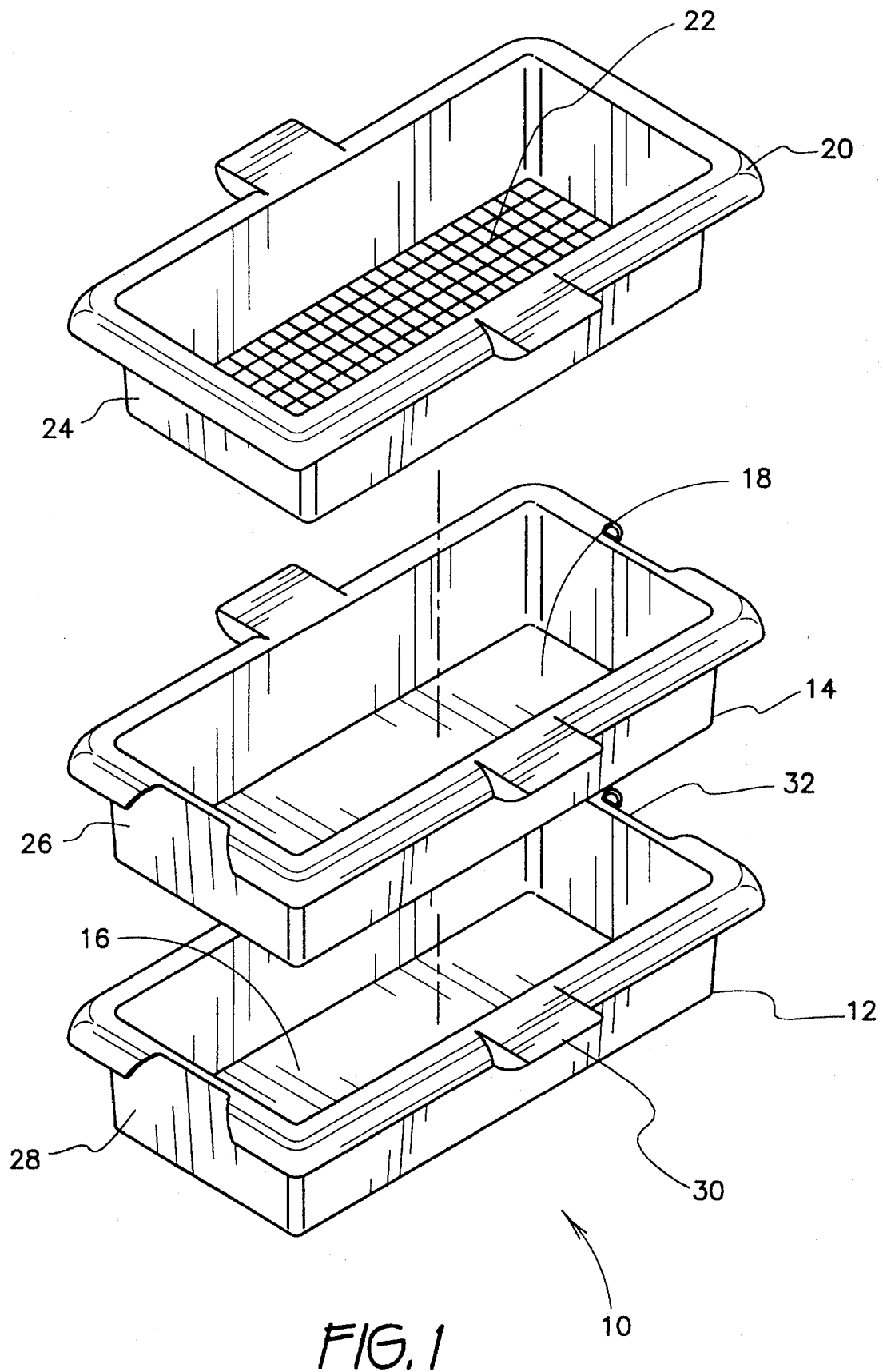
FIG. 1 shows an exploded perspective view of a first embodiment of the present invention.

Referring now to FIG. 1, a perspective view of a first embodiment of the invention generally designated by the numeral 10 is shown. The invention has two nestable receptacles, 12 and 14, both receptacles having solid bottom panels 16 and 18 respectively. A third nestable receptacle 20 has a perforated bottom panel 22 and serves as a sifter for removing waste from the litter. The sidewall 24 of the third receptacle 20 is of approximately the same height as the sidewalls 26 and 28 respectively of receptacles 12 and 14. The sidewall 24 includes integrally formed handles 30 which serve to help secure a removable top as will be explained later. The combined height of the three receptacles is optimal for allowing easy access by the pet while still being sufficient for containment of any litter or waste which may be displaced by the pet.

Figure 4:
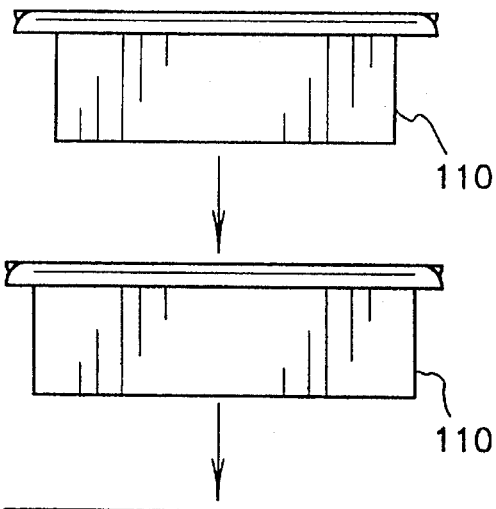
FIG. 4 shows a front view of a receptacle of the present invention with the lid attached.
Figure 4:
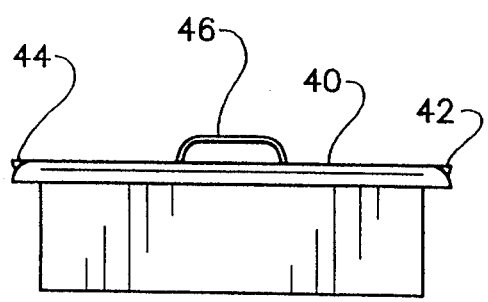

For facilitating handling of the receptacles, they are preferably provided with a pair of mutually opposed handles. The handles 30 and 32 are shaped so as to provide for locking engagement with handles in a lid 40 as is shown in FIG. 4.

The lid 40 has handles 42 and 44 which are shaped for locking engagement with handle pairs 30 or 32. Preferably, the lid 40 also has an internal lip (not shown) for locking engagement with the top edge of receptacles 12 or 14 so as to prevent any spillage of the litter or other absorbent particulate material. The lid 40 also has a pour spout 46 to allow for pouring of the litter into another receptacle or into a waste receptacle.

Figure 2:
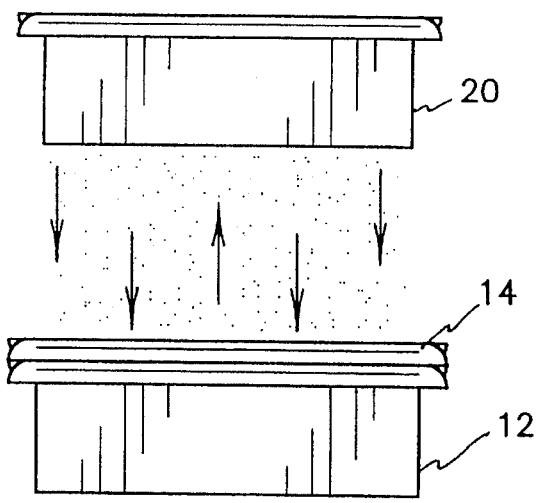
FIG. 2 shows a side view of the first embodiment with a separation tray in vertically exploded relationship.

In operation, a bed of fluid absorbent material such as litter is deposited on the receptacle 20. The layer of litter is made sufficiently deep to prevent moisture from seeping through and touching the bottom panel 22 during normal use by the pet. When sufficient waste is deposited on the litter, the receptacle 20 is lifted out of the receptacles 12 and 14 and shifted from side to side to sift the "clean" litter out leaving the waste on the bottom panel 22 as shown in FIG. 2. The waste is then discarded and the receptacle 20 can be cleaned as desired. The receptacles 12 and 14 are then separated, with one of the receptacles having clean litter therein and the other being empty. The receptacle 20 is then placed inside of the empty receptacle, and the lid 40 is placed on the full receptacle. The contents of the full receptacle can then be poured out through the pour spout 46 into the empty receptacle. The lid 40 is then removed and the now full receptacle with the separator receptacle 20 already nested therein can be nested inside the empty receptacle and the system is ready for use.

Figure 3:
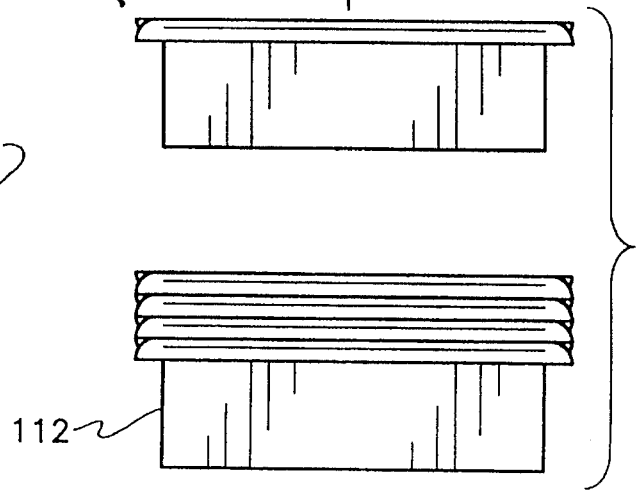
FIG. 3 shows a vertically exploded side view of an alternative embodiment of the present invention.

Referring now to FIG. 3, an alternative embodiment of the present invention is shown. In this embodiment, generally indicated by the numeral 100, a plurality of separator receptacles 110 are placed inside a receptacle 112 having a solid bottom panel. In use, the separator receptacles 110 are lifted out one at a time and shifted each time cleaning is desired. The litter can be replaced when the final receptacle is removed. The lid 40 can be used with receptacle 112 when the litter is to be discarded.

While there is herein shown and described what is conceived to be the most practical and preferred embodiments of this invention, it is recognized that departures may be made therefrom within the scope of this invention which is not limited to the details disclosed herein but is to be accorded the full scope of the claims so as to embrace any and all equivalent devices.

What is claimed is:

1. An animal waste container system comprising:

first and second open top receptacles, each receptacle having a bottom and side wall, a third open top receptacle, the third open top receptacle being nested on top of both said first and second receptacles, the third receptacle having a perforated bottom, the perforated bottom supporting a bed of litter;

a removable top capable of being secured onto either said first, second, or third receptacle, the top having a substantially flat horizontal wall having its edges defined by a downwardly extending vertical wall, and a pour spout formed in said horizontal wall.

2. The system of claim 1, whereby said top is lockingly engaged with said first, second, or third receptacle to allow for pouring waste and particulate matter therefrom.

3. The device of claim 1 where said top has handles formed in opposing sides, said handles being adapted for locking engagement with corresponding handles formed in opposing sides of said first, second, and third receptacles.

\* \* \* \* \*